(12) United States Patent
Björkman et al.

(10) Patent No.: US 9,770,969 B2
(45) Date of Patent: Sep. 26, 2017

(54) HYBRID POWERTRAIN WITH A GEARBOX AND METHOD TO CONTROL THE HYBRID DRIVETRAIN

(71) Applicant: SCANIA CV AB, Södertälje (SE)

(72) Inventors: Mathias Björkman, Tullinge (SE);
Niklas Pettersson, Stockholm (SE);
Johan Lindström, Nyköping (SE);
Mikael Bergquist, Huddinge (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/780,463

(22) PCT Filed: Mar. 20, 2014

(86) PCT No.: PCT/SE2014/050338
§ 371 (c)(1),
(2) Date: Sep. 25, 2015

(87) PCT Pub. No.: WO2014/158076
PCT Pub. Date: Oct. 2, 2014

(65) Prior Publication Data
US 2016/0047441 A1    Feb. 18, 2016

(30) Foreign Application Priority Data

Mar. 27, 2013 (SE) ........................................ 1350392
Mar. 27, 2013 (SE) ........................................ 1350393
Mar. 27, 2013 (SE) ........................................ 1350394

(51) Int. Cl.
*B60K 1/02*    (2006.01)
*B60K 6/365*   (2007.10)
(Continued)

(52) U.S. Cl.
CPC ................ *B60K 6/365* (2013.01); *B60K 1/02* (2013.01); *B60K 6/40* (2013.01); *B60K 6/445* (2013.01);
(Continued)

(58) Field of Classification Search
CPC .......... B60K 6/365; B60K 1/02; B60K 5/547; B60W 10/115; B60W 20/40; B60W 10/02;
(Continued)

(56) References Cited

U.S. PATENT DOCUMENTS 7,479,081 B2    1/2009   Holmes .............................. 475/5
7,931,102 B2    4/2011   Katsuta et al. .......... 180/65.225
(Continued)

FOREIGN PATENT DOCUMENTS

DE    10 2006 025 525 A1    12/2007
DE    10 2008 0437 A1        6/2009
(Continued)

OTHER PUBLICATIONS

International Search Report dated Jul. 4, 2014 issued in corresponding International patent application No. PCT/SE2014/050338.
(Continued)

*Primary Examiner* — Roger Pang
(74) *Attorney, Agent, or Firm* — Ostrolenk Faber LLP

(57) ABSTRACT

A hybrid powertrain that includes a combustion engine (4); a gearbox (2) with an input shaft (8) and an output shaft (20); a first planetary gear (10) connected to the input shaft (8) a second planetary gear (12) connected to the first planetary gear (10); a first electrical machine (14) connected to the first planetary gear (10); a second electrical machine (16) connected to the second planetary gear (12); a first gear pair (G1, 60) and a third gear pair (G1, 72) situated between the first planetary gear (10) and the output shaft (20); and a
(Continued)

US 9,770,969 B2

Page 2 second gear pair (66) and a fourth gear pair (G2, 78) situated between the second planetary gear (12) and the output shaft (20); a countershaft (18) provided between the respective first and the second planetary gears (10, 12) and the output shaft (2), and (18) connected to the output shaft (20) via a fifth gear pair (G3M 21). Also, disclosed is a method for controlling the hybrid powertrain. Also a method for controlling a hybrid powertrain (3) and a computer program (P) for controlling the hybrid powertrain (3).

26 Claims, 4 Drawing Sheets

(51) Int. Cl.
| | |
|---|---|
| B60K 6/40 | (2007.10) |
| B60K 6/445 | (2007.10) |
| B60K 6/547 | (2007.10) |
| F16H 3/00 | (2006.01) |
| F16H 3/72 | (2006.01) |
| B60W 20/30 | (2016.01) |
| F16H 3/66 | (2006.01) |
| F16H 61/04 | (2006.01) |
| F16H 61/686 | (2006.01) |
| F16H 61/688 | (2006.01) |
| B60W 10/02 | (2006.01) |
| B60W 10/115 | (2012.01) |
| B60W 20/40 | (2016.01) |
| F16H 37/10 | (2006.01) |
| F16H 37/08 | (2006.01) |

(52) U.S. Cl.
CPC .......... *B60K 6/547* (2013.01); *B60W 10/02* (2013.01); *B60W 10/115* (2013.01); *B60W 20/30* (2013.01); *B60W 20/40* (2013.01); *F16H 3/006* (2013.01); *F16H 3/66* (2013.01); *F16H 3/728* (2013.01); *F16H 61/04* (2013.01); *F16H 61/686* (2013.01); *F16H 61/688* (2013.01); *B60W 2710/021* (2013.01); *B60W 2710/1005* (2013.01); *B60Y 2200/92* (2013.01); *B60Y 2400/73* (2013.01); *B60Y 2400/75* (2013.01); *F16H 2037/0866* (2013.01); *F16H 2037/101* (2013.01); *F16H 2061/0429* (2013.01); *F16H 2200/2007* (2013.01); *F16H 2200/2043* (2013.01); *F16H 2200/2064* (2013.01); *Y02T 10/6239* (2013.01); *Y10S 903/911* (2013.01); *Y10S 903/919* (2013.01); *Y10S 903/93* (2013.01); *Y10S 903/945* (2013.01); *Y10T 477/23* (2015.01); *Y10T 477/26* (2015.01)

(58) Field of Classification Search
CPC .............. B60W 2710/1005; F16H 3/66; F16H 61/686; F16H 61/688; F16H 3/006; F16H 3/728; F16H 2200/2007; F16H 2200/2064; F16H 2200/2094; Y10T 477/23; Y10T 477/26
USPC ....... 475/5, 207, 218, 219, 302; 74/629, 330
See application file for complete search history.

(56) References Cited

U.S. PATENT DOCUMENTS

| | | | |
|---|---|---|---|
| 8,047,314 B2 | 11/2011 | Oba et al. | 180/65.265 |
| 8,100,207 B2 | 1/2012 | Oba et al. | 180/65.285 |
| 8,231,491 B2 | 7/2012 | Oba et al. | 475/5 |
| 8,251,165 B2 | 8/2012 | Katsuta et al. | 180/65.265 |
| 2002/0045507 A1 | 4/2002 | Bowen | 475/5 |
| 2003/0100395 A1 | 5/2003 | Hiraiwa | 475/5 |
| 2005/0227803 A1 | 10/2005 | Holmes | |
| 2007/0099738 A1* | 5/2007 | Holmes | B60K 6/365 475/5 |
| 2008/0064550 A1 | 3/2008 | Holmes | |
| 2008/0103002 A1 | 5/2008 | Holmes | 475/5 |
| 2009/0320629 A1 | 12/2009 | Akashi et al. | |
| 2010/0029436 A1* | 2/2010 | Katsuta | B60K 6/36 477/5 |
| 2010/0044128 A1* | 2/2010 | Oba | B60K 6/387 180/65.25 |
| 2015/0375736 A1 | 12/2015 | Kaltenbach et al. | |
| 2016/0047441 A1 | 2/2016 | Björkman et al. | |
| 2016/0053864 A1 | 2/2016 | Lindström et al. | |
| 2016/0059686 A1 | 3/2016 | Björkman et al. | |
| 2016/0061297 A1 | 3/2016 | Lindström et al. | |
| 2016/0091063 A1* | 3/2016 | Rekow | B60L 1/006 475/153 |

FOREIGN PATENT DOCUMENTS

| | | |
|---|---|---|
| EP | 1 280 677 B1 | 8/2004 |
| EP | 1 126 987 B1 | 8/2005 |
| WO | WO 2007/110721 A1 | 10/2007 |
| WO | WO 2008/046185 A1 | 4/2008 |
| WO | WO 2008/081893 A1 | 7/2008 |
| WO | WO 2012/073651 A1 | 6/2012 |
| WO | WO 2014/046580 A1 | 3/2014 |

OTHER PUBLICATIONS

International Preliminary Report on Patentability dated Jun. 22 2015 issued in corresponding International patent application No. PCT/SE2014/050338.

* cited by examiner

HYBRID POWERTRAIN WITH A GEARBOX AND METHOD TO CONTROL THE HYBRID DRIVETRAIN

CROSS-REFERENCE TO RELATED APPLICATIONS

The present application is a 35 U.S.C. §371 national phase conversion of PCT/SE2014/050338, filed Mar. 20, 2014, which claims priority to Swedish Application No. 1350394-1, filed Mar. 27, 2013, Swedish Application No. 1350392-5, filed Mar. 27, 2013 and Swedish Application No. 1350393-3, filed Mar. 27, 2013, the contents of which are incorporated herein by reference.

BACKGROUND TO THE INVENTION AND PRIOR ART

The present invention relates to a hybrid powertrain. The invention relates also to a vehicle provided with the hybrid powertrain, a method for controlling the hybrid powertrain, a computer program to enable a computer to conduct the method for controlling the hybrid powertrain, and a computer program product comprising program code of the computer program stored on a computer-readable medium.

Hybrid vehicles may be powered by a primary means of propulsion which may be a combustion engine, and by a secondary means of propulsion which may be an electrical machine. The electrical machine will be equipped with at least one energy store, e.g. an electrochemical store for electrical energy, and with regulating equipment to regulate the flow of electrical energy between the energy store and the electrical machine. The electrical machine may thus serve alternately as a motor and a generator, depending on the vehicle's operating state. When the vehicle is braked, the electrical machine will generate electrical energy which goes into the energy store. This is usually called regenerative braking whereby the vehicle is braked by the electrical machine and the combustion engine. The stored electrical energy will subsequently be used for operation of the vehicle.

A planetary gear usually comprises three components arranged for rotation relative to one another, via a sunwheel, a planet wheel carrier and a ring gear. Knowing the number of teeth which the sunwheel and the ring gear have makes it possible to determine the mutual rotation speeds of the three components during operation. One of the planetary gear's components may be connected to an output shaft of a combustion engine. This component of the planetary gear will therefore rotate at a speed corresponding to that of the engine output shaft. A second component of the planetary gear may be connected to an input shaft of a gearbox. This component of the planetary gear will therefore rotate at the same speed as the gearbox input shaft. A third component of the planetary gear is connected to a rotor of an electrical machine to achieve hybrid operation. This component of the planetary gear will therefore rotate at the same speed as the electrical machine's rotor if they are connected directly to one another. Alternatively, the electrical machine may be connected to the third component of the planetary gear via a transmission which has a gear ratio, in which case they may rotate at different speeds. The speed and/or the torque of electrical machines may be regulated steplessly. In operating situations where a desired speed and/or torque are to be imparted to the gearbox input shaft, a control unit will use knowledge of the combustion engine's speed to calculate the speed at which the third component needs to be driven to cause the gearbox input shaft to rotate at the desired speed. A control unit will activate the electrical machine to impart the calculated speed to the third component and hence the desired speed to the gearbox input shaft.

Depending on the configuration of the gearbox connected to the planetary gear it may be possible to avoid a torque break between gear steps, but separate and complicated devices in the gearbox are often required to eliminate or reduce the torque break so as to achieve a sensation of stepless gearchange.

Connecting the combustion engine's output shaft, the electrical machine's rotor and the gearbox input shaft to a planetary gear makes it possible to dispense with the conventional clutch mechanism. During acceleration of the vehicle an increased torque has to be delivered from the combustion engine and the electrical machine to the gearbox and thence to the vehicle's tractive wheels. As both the combustion engine and the electrical machine are connected to the planetary gear, the largest possible torque delivered by them will be limited by whichever of their greatest torques is less than that of the other, taking into account the gear ratio between them. In situations where the greatest torque of the electrical machine is less than the greatest torque of the combustion engine, taking into account the gear ratio between them, the electrical machine will not be able to generate sufficient reaction torque to the planetary gear, with the result that the combustion engine will not be able to transmit its greatest torque to the gearbox and thence to the vehicle's tractive wheels. The greatest torque transferrable to the gearbox is thus limited by the capacity of the electrical machine. This is also indicated by the so-called planet equation.

Using a conventional clutch which disconnects the gearbox input shaft from the combustion engine during gearchange processes in the gearbox involves disadvantages, e.g. warming of the discs of the clutch, resulting in clutch disc wear and greater fuel consumption. Moreover, a conventional clutch mechanism is relatively heavy and expensive. It also occupies a relatively large amount of space in the vehicle.

The space available for the propulsion device in a vehicle is often limited. If the propulsion device comprises a plurality of components, e.g. a combustion engine, an electrical machine, a gearbox and a planetary gear, the configuration needs to be compact. If further components, e.g. a regenerative brake device, are to be incorporated, the need for a compact configuration of the components of the propulsion device will be still greater. At the same time, the dimensions of these components have to enable them to absorb necessary forces and torques.

Certain types of vehicles, particularly heavy trucks and buses, need a large number of gear steps. This increases the number of components in the gearbox, which has also to be dimensioned to absorb large forces and torques which occur in such heavy vehicles, thereby increasing its size and weight.

The components of the propulsion device are also required to be of high reliability and high operational safety. A gearbox that comprises disc clutches is subject to wear, which affects its reliability and service life.

During regenerative braking, kinetic energy is converted to electrical energy which goes into an energy store, e.g. accumulators. A factor which affects the service life of the energy store is its number of cycles of supplying current to and absorbing current from the electrical machines. The more numerous the cycles, the shorter the energy store's service life.

In certain operating conditions it is desirable to switch the combustion engine off with the object of saving fuel and with a view to preventing cooling of its exhaust post-treatment system. The vehicle will then be propelled by the electrical machine. When a torque contribution is needed in the hybrid powertrain, or the energy store needs charging, the combustion engine has to be started quickly and efficiently.

EP-B1-1126987 discloses a gearbox with dual planetary gears. The sunwheel of each planetary gear is connected to an electrical machine and the ring gears of the planetary gears are connected to one another. The planet wheel carriers of each planetary gear are connected to a number of pairs of gears in such a way as to provide an infinite number of gear steps. Another specification, EP-B1-1280677, also discloses how the planetary gears may be bridged by a gear step provided on the output shaft of the combustion engine.

US-A1-20050227803 discloses a vehicle transmission with two electrical machines which are connected to respective sunwheels of two planetary gears. The planetary gears have a common planet wheel carrier connected to the input shaft of the transmission.

WO2008/046185-A1 discloses a hybrid transmission with two planetary gears whereby an electrical machine is connected to one of the planetary gears and a double clutch cooperates with the other planetary gear. The two planetary gears also cooperate with one another via a gearwheel transmission.

SUMMARY OF THE INVENTION

Despite known solutions in this field, there is a need to further develop a hybrid powertrain and a method for controlling such a hybrid powertrain in order to effect gear changes without torque breaks and to achieve optimum brake regeneration.

The object of the invention is to propose a novel and advantageous hybrid powertrain which makes gear changes possible without torque breaks and achieves optimum brake regeneration.

Another object of the invention is to propose a novel and advantageous method for controlling a hybrid powertrain.

A further object of the invention is a novel and advantageous computer program for controlling a hybrid powertrain.

These objects are achieved with the hybrid powertrain indicated in the introduction.

These objects are also achieved with the vehicle indicated in the introduction.

These objects are also achieved with the method indicated in the introduction.

These objects are also achieved with the computer program for controlling the hybrid powertrain indicated in the introduction.

These objects are also achieved with the computer program product for controlling the hybrid powertrain indicated in the introduction.

The hybrid powertrain according to the invention makes efficient and reliable gear changes possible without torque breaks. The hybrid powertrain comprises a combustion engine; a gearbox with an input and an output shaft; a first planetary gear connected to the input shaft; a second planetary gear connected to the first planetary gear; a first electrical machine connected to the first planetary gear; a second electrical machine connected to the second planetary gear; a first gear pair and a third gear pair which are situated between the first planetary gear and the output shaft; and a second gear pair and a fourth gear pair, which are situated between the second planetary gear and the output shaft. The hybrid powertrain further comprises a countershaft situated between the respective first and second planetary gears and the output shaft. The countershaft is connected to the output shaft via a fifth gear pair.

In one embodiment, a first mainshaft is connected to the first planetary gear; a second mainshaft is connected to the second planetary gear; the first and third gear pairs are situated on the first mainshaft and the countershaft; and the second and fourth gear pairs are situated on the second mainshaft and the countershaft.

Connecting a first planet wheel carrier of the first planetary gear to a second sunwheel of the second planetary gear, a first sunwheel of the first planetary gear to the first mainshaft and a second planet wheel carrier of the second planetary gear to the second mainshaft results in a transmission which changes gear without torque breaks.

The input shaft is preferably connected to the first planet wheel carrier.

In one embodiment, a clutch mechanism is provided between the first mainshaft and the output shaft.

The gearbox is preferably provided with a number of gear pairs that comprise gearwheels, which can be mechanically locked to and disconnected from a countershaft, resulting in a number of fixed gearsteps, which can be changed without torque breaks. The gearwheels lockable to the countershaft also result in a compact configuration with high reliability and high operational safety. Alternatively, pinions which form part of gear pairs may be arranged to be lockable to and disconnectable from the first or the second mainshaft.

The gear pairs will each have a gear ratio adapted to the vehicle's desired operating characteristics. Advantageously, the gear pair with the highest ratio relative to the other pairs will be connected when the lowest gear is engaged.

In one embodiment, the first gear pair comprises a first pinion that is attached firmly to the first mainshaft and in mutual engagement with a first gearwheel, which is arranged to be connectable to and disconnectable from the countershaft. The third gear pair comprises a third pinion that is attached firmly to the first mainshaft and in mutual engagement with a third gearwheel, which is arranged to be connectable to and disconnectable from the countershaft.

The second gear pair comprises a second pinion that is attached firmly to the second mainshaft and in mutual engagement with a second gearwheel, which is arranged to be connectable to and disconnectable from the countershaft. The fourth gear pair comprises a fourth pinion that is attached firmly to the second mainshaft and in mutual engagement with a fourth gearwheel, which is arranged to be connectable to and disconnectable from the countershaft.

In one embodiment, the fifth gear pair comprises a gearshift element arranged to be disconnectable from the countershaft by a fifth clutch element. Advantageously, the gearshift element will be a fifth gearwheel in engagement with a sixth gearwheel, which is attached firmly to the output shaft.

In one embodiment, a first rotor of the first electrical machine is connected to a first ring gear of the first planetary gear, and a second rotor of the second electrical machine is connected to a second ring gear of the second planetary gear.

The electrical machines connected to the planetary gears may generate current or impart torque, depending on desired operating states. In certain operating situations they may also provide each other with current.

The gearbox according to the invention obviates conventional sliding clutches between the combustion engine and the gearbox.

A locking mechanism is provided to connect the combustion engine's output shaft firmly to the gearbox housing, thus also locking the first planet wheel carrier to the gearbox housing. This locking mechanism, which locks the engine output shaft and the first planet wheel carrier firmly to the gearbox housing, renders the gearbox and hence the vehicle suitable for being powered by the electrical machines. The electrical machines thus deliver torque to the gearbox output shaft.

A first clutch unit and a second clutch unit are provided between the planet wheel carrier and the sunwheel of each planetary gear. The purpose of these clutch units is to lock each planet wheel carrier firmly to the respective sunwheel. When the planet wheel carrier and the sunwheel are connected to one another, the power from the combustion engine will pass through the planet wheel carrier, the clutch unit, the sunwheel and thence to the gearbox, with the result that the planet wheels absorb no torque. This makes it possible for the dimensions of the planet wheels to be appropriate solely to the electrical machine's torque instead of the combustion engine's torque, making it possible for these wheels to be of smaller dimensions. The result is a propulsion device according to the invention, which is of compact configuration, low weight and low manufacturing cost.

The clutch units and the locking mechanisms preferably comprise an annular sleeve, which is moved axially between connected and disconnected positions. The sleeve surrounds the rotating components of the gearbox substantially concentrically and is moved between the connected and disconnected positions by a power element. The result is a compact configuration with low weight and low manufacturing cost.

In order to use the respective first and second clutch units to connect together the sunwheel and the planet wheel carrier of the respective planetary gear, the combustion engine and/or the first electrical machine and/or the second electrical machine are operated in such a way that a synchronous rotation speed is reached between the sunwheel and the planet wheel carrier, whereupon the clutch unit is moved so that the sunwheel and the planet wheel carrier become mechanically connected to one another.

To disconnect the sunwheel and the planet wheel carrier of the respective planetary gear, the first and/or the second electrical machines are operated in such a way that torque balance occurs in the planetary gear. When torque balance is reached, the clutch unit is moved in such a way that the sunwheel and the planet wheel carrier are no longer mechanically connected to one another.

Torque balance means a state in which a ring gear which is part of the respective planetary gear is acted upon by a torque which corresponds to the product of the torque acting upon the planetary gear's planet wheel carrier and the gear ratio of the planetary gear while at the same time the planetary gear's sunwheel is acted upon by a torque corresponding to the product of the torque acting upon the planet wheel carrier and the gear ratio of the planetary gear. In the situation where two of the planetary gear's constituent parts (sunwheel, ring gear and planet wheel carrier) are connected together by a clutch unit, this clutch unit will transfer no torque between the planetary gear's parts when there is torque balance. The clutch unit may thus easily be moved and the planetary gear's constituent parts be disconnected.

The method according to the invention provides an efficient and reliable way of controlling a hybrid powertrain which comprises a combustion engine; a gearbox with an input and an output shaft; a first planetary gear connected to the input shaft; a second planetary gear connected to the first planetary gear; a first electrical machine connected to the first planetary gear; a second electrical machine connected to the second planetary gear; a first gear pair and a third gear pair which are situated between the first planetary gear and the output shaft; and a second gear pair and a fourth gear pair which are situated between the second planetary gear and the output shaft. Connecting the first or the third gear pair, connecting the second or the fourth gear pair, connecting a fifth gear pair to a countershaft so that the countershaft is connected to the output shaft, and engaging a gear by connecting together two rotatable components (28, 32 51) of the second planetary gear (12) is an efficient and reliable way of effecting engagement of a gear.

The steps of connecting the first or the third gear pair, connecting the second or the fourth gear pair and connecting the fifth gear pair to the countershaft may be conducted in any desired sequence or in parallel.

In one embodiment, the two rotatable components of the second planetary gear comprise the second sunwheel and the second planet wheel carrier, in which case the combustion engine is operated in such a way that a synchronous rotation speed is reached between the second sunwheel and the second planet wheel carrier, followed by the second clutch unit being moved to lock the second sunwheel and the second planet wheel carrier to one another.

Another embodiment of the method further comprises the steps of disconnecting the rotatable components of the second planetary gear from one another and engaging a subsequent gear by using a first clutch unit to connect two rotatable components of the first planetary gear to one another.

Another embodiment of the method further comprises the step of disconnecting whichever of the second and fourth gear pairs was previously connected to the countershaft. It further comprises the steps of connecting whichever of the second and fourth gear pairs was not disconnected in the previous step, disconnecting the rotatable components of the first planetary gear from one another, engaging a subsequent gear by connecting two rotatable components of the second planetary gear to one another, disconnecting the first or the third gear pair from the countershaft and connecting the first or the third gear pair to the countershaft.

Another embodiment of the method comprises again the steps of disconnecting the rotatable components of the second planetary gear from one another and engaging a subsequent gear by using a first clutch unit to connect two rotatable components of the first planetary gear to one another.

A further embodiment of the method comprises the further steps of disconnecting the first or the third gear pair from the countershaft, firmly locking a clutch mechanism situated between the first planetary gear and the output shaft so that the first planetary gear becomes connected to the output shaft, disconnecting the fifth gear pair from the countershaft, connecting the first or the third gear pair to the countershaft, disconnecting the rotatable components of the first planetary gear from one another and engaging a subsequent gear by connecting two rotatable components of the second planetary gear to one another.

Another embodiment of the method further comprises the steps of disconnecting the rotatable components of the second planetary gear from one another and engaging a subsequent gear by connecting two rotatable components of the first planetary gear to one another.

A further embodiment of the method further comprises the steps of disconnecting the first or the third gear pair from the countershaft, connecting whichever of the first and third gear pairs was not disconnected in the previous step, disconnecting the rotatable components of the first planetary gear from one another and engaging a subsequent gear by connecting two rotatable components of the second planetary gear to one another.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
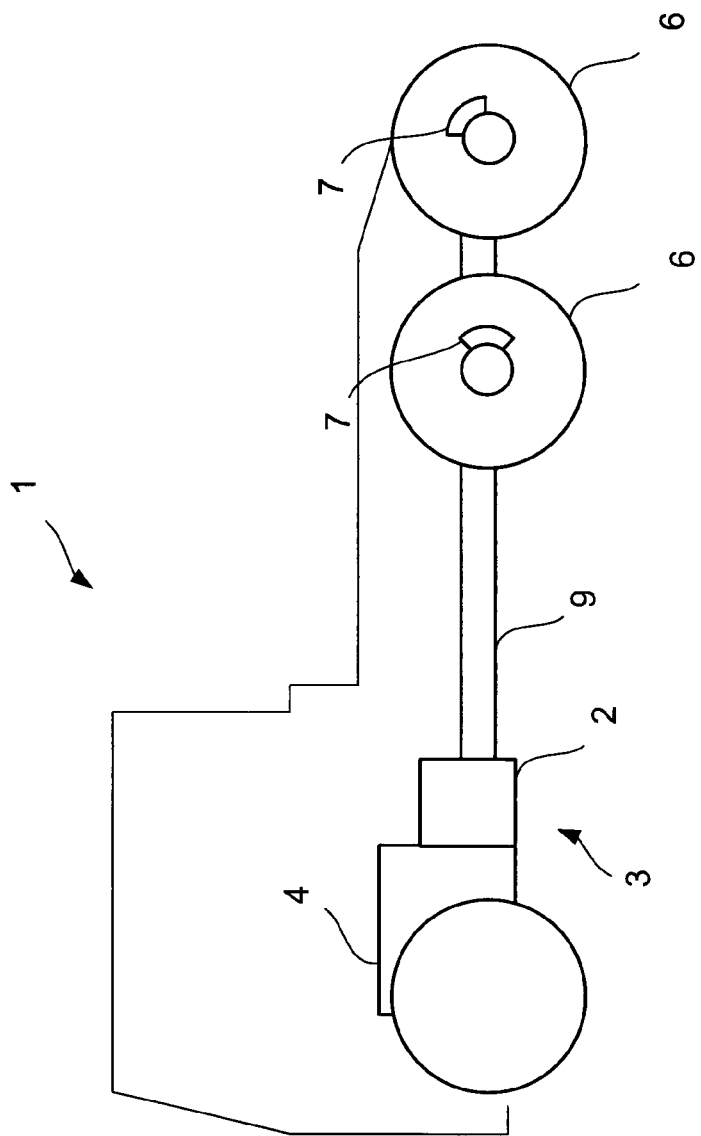
FIG. 1 depicts schematically a vehicle in side view with a combustion engine and a hybrid powertrain according to the present invention.

FIG. 1 is a schematic sideview of a vehicle 1 provided with a gearbox 2 and a combustion engine 4 which form part of a hybrid powertrain 3. The engine 4 is connected to the gearbox 2 which is itself further connected to the vehicle's tractive wheels 6 via a propeller shaft 9. The tractive wheels are provided with brake devices 7 for braking the vehicle.

Figure 2:
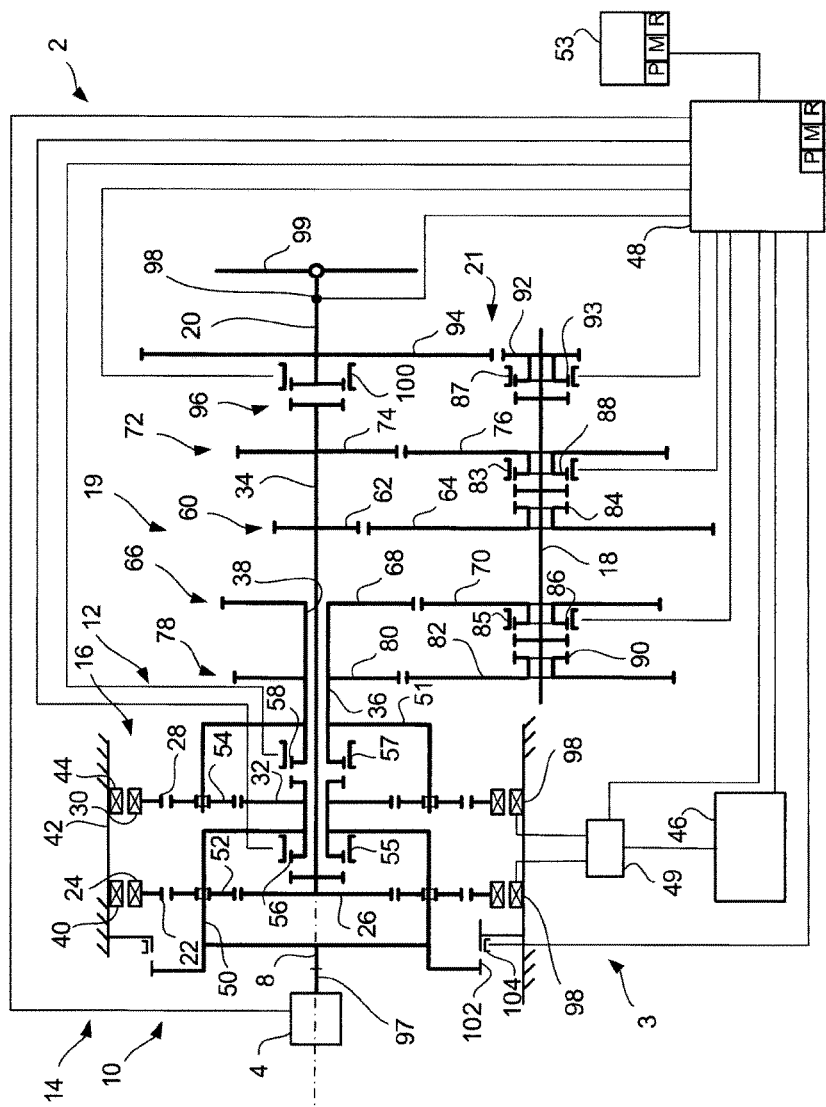
FIG. 2 is a schematic sideview of a hybrid powertrain according to the present invention.

FIG. 2 is a schematic sideview of a hybrid powertrain 3 with a gearbox 2 which comprises an input shaft 8, respective first and second planetary gears 10 and 12, respective first and second electrical machines 14 and 16, a countershaft 18 and an output shaft 20. The first planetary gear 10 has a first ring gear 22 to which a first rotor 24 of the first electrical machine 14 is connected. The first planetary gear has also a first sunwheel 26. The second planetary gear 12 has a second ring gear 28 to which a second rotor 30 of the second electrical machine 16 is connected. The second planetary gear has a second sunwheel 32. The first and second sunwheels 26 and 32 are arranged coaxially, which in the version depicted causes a first mainshaft 34 attached to the first sunwheel 26 to extend within a second mainshaft 36, which is attached to the second sunwheel 32 and is provided with a central bore 38. It is also possible for the first mainshaft 34 to be arranged parallel with and alongside the second mainshaft 36.

The first electrical machine 14 is provided with a first stator 40 connected to the vehicle via a gear housing 42, which surrounds the gearbox 2. The second electrical machine 16 is provided with a second stator 44 connected to the vehicle via the gear housing 42, which surrounds the gearbox. The respective first and second electrical machines 14 and 16 are connected to an energy store 46, e.g. a battery, which energises them in certain operating states. In other operating states, the electrical machines may serve as generators, in which case current will be supplied to the energy store. An electronic control unit 48 is connected to the energy store and controls the supply of current to the electrical machines. The energy store is preferably connected to the electrical machines via a changeover switch 49, which is connected to the control unit 48. In certain operating situations, the electrical machines may also drive one another, in which case electrical energy passes from one to the other via the changeover switch connected to them. This makes it possible to achieve a power balance between the electrical machines. Another computer 53 may also be connected to the control unit 48 and the gearbox 2.

The first planetary gear 10 is provided with a first planet wheel carrier 50, which supports a first set of planet wheels 52. The second planetary gear 12 is provided with a second planet wheel carrier 51, which supports a second set of planet wheels 54. The first set of planet wheels 52 cooperates with the first ring gear 22 and the first sunwheel 26. The second set of planet wheels 54 cooperates with the second ring gear 28 and the second sunwheel 32. The gearbox input shaft 8 is connected to the first planet wheel carrier 50.

A first clutch unit 56 is provided between the first sunwheel 26 and the first planet wheel carrier 50. Applying the first clutch unit 56 so that the first sunwheel 26 and the first planet wheel carrier 50 are connected together and therefore cannot rotate relative to one another will cause them to rotate at the same speed.

A second clutch unit 58 is provided between the second sunwheel 32 and the second planet wheel carrier 51. Applying the second clutch unit 58 so that the second sunwheel 32 and the second planet wheel carrier 51 are connected together and therefore cannot rotate relative to one another will cause them rotate at the same speed.

The first and second clutch units 56, 58 preferably have respective first and second splined shift sleeves 55 and 57, which are movable axially relative to a splined portion of the respective first and second planet wheel carriers 50 and 51 and relative to a splined portion of the respective sunwheels 26 and 32. Moving the respective shift sleeves 55, 57 so that the splined portions are connected via them will respectively cause the first planet wheel carrier 50 and the first sunwheel 26, and the second planet wheel carrier 51 and the second sunwheel 32, to become locked together and unable to rotate relative to one another.

In the version depicted in FIG. 2, the first clutch unit 56 is situated between the first sunwheel 26 and the first planet wheel carrier 50, and the second clutch unit 58 is situated between the second sunwheel 28 and the second planet wheel carrier 51. It is possible, however, for there to be a further or alternative clutch unit (not depicted) between the first ring gear 22 and the first planet wheel carrier 50, and also for there to be a further or alternative clutch unit (not depicted) between the second ring gear 28 and the second planet wheel carrier 51.

A transmission device 19 comprising a first gear pair 60 situated between the first planetary gear 10 and the output shaft 20 is connected to the first and the second mainshafts 34, 36. The first gear pair 60 comprises a first pinion 62 and a first gearwheel 64 in engagement with one another. A second gear pair 66 situated between the second planetary gear 12 and the output shaft 20 comprises a second pinion 68 and a second gearwheel 70 in mutual engagement. A third gear pair 72 situated between the first planetary gear 10 and the output shaft 20 comprises a third pinion 74 and a third gearwheel 76 in mutual engagement. A fourth gear pair 78 situated between the second planetary gear 12 and the output shaft 20 comprises a fourth pinion 80 and a fourth gearwheel 82 in mutual engagement.

The respective first and third pinions 62 and 74 are situated on and firmly connected to the first mainshaft 34 so that they cannot rotate relative to it. The respective second and fourth pinions 68 and 80 are situated on and firmly connected to the second mainshaft 36 so that they cannot rotate relative to it.

The countershaft 18 extends substantially parallel with the first and second mainshafts 34 and 36. The first, second, third and fourth gearwheels 64, 70, 76 and 82 are supported by the countershaft 18. The first pinion 62 engages with the first gearwheel 64, the second pinion 68 with the second gearwheel 70, the third pinion 74 with the third gearwheel 76, and the fourth pinion 80 with the fourth gearwheel 82.

The first, second, third and fourth gearwheels 64, 70, 76 and 82 can individually be locked to and disconnected from the countershaft 18 by respective first, second, third and fourth clutch elements 84, 86, 88 and 90. These clutch elements preferably take the form of splined portions formed on the respective gearwheels 64, 70, 76 and 82 and on the countershaft 18 and cooperating with fifth and sixth shift sleeves 83, 85 which engage mechanically with the splined portions of the first to fourth gearwheels 64, 70, 76 and 82 and the countershaft 18. The first and third clutch elements 84, 88 are preferably provided with a common shift sleeve 83, and the second and fourth clutch elements 86, 90 are preferably provided with a common shift sleeve 85. In the disconnected state, relative rotation may occur between the respective gearwheels 64, 70, 76 and 82 and the countershaft 18. The clutch elements 84, 86, 88 and 90 may also take the form of friction clutches. The countershaft 18 bears also a fifth gearwheel 92, which engages with a sixth gearwheel 94 situated on the gearbox output shaft 20.

The countershaft 18 is situated between the respective first and the second planetary gears 10, 12 and the output shaft 20 in such a way that it is connected to the output shaft 20 via a fifth gear pair 21, which comprises the fifth and sixth gearwheels 92, 94. The fifth gearwheel 92 is arranged to be connectable to and disconnectable from the countershaft 18 by a fifth clutch element 93.

By disconnecting the fifth gearwheel 92, which is situated disconnectably on the countershaft 18, it is possible to transfer torque from the second planetary gear 12 to the countershaft 18, e.g. via the second gear pair 66, and to further transfer torque from the countershaft 18 to the output shaft 20, e.g. via the first gear pair 60. The result is a number of gearsteps whereby torque from either of the planetary gears 10, 12 may be transferred to the countershaft 18 and thence to whichever mainshaft 34, 36 is connected to the other planetary gear 10, 12, in order finally to transfer torque to the gearbox output shaft 20. This does, however, presuppose that a clutch mechanism 96 situated between the first mainshaft 34 and the output shaft 20 is connected, as described in more detail below.

The fifth gearwheel 92 may be locked to and disconnected from the countershaft 18 by a fifth clutch element 93. The clutch element 93 preferably takes the form of splined portions formed on the fifth gearwheel 92 and on the countershaft 18 and cooperating with a ninth shift sleeve 87 which engages mechanically with the splined portions of the fifth gearwheel 92 and of the countershaft 18. In the disconnected state, relative rotation may occur between the fifth gearwheel 92 and the countershaft 18. The fifth clutch element 93 may also take the form of friction clutches.

Torque transfer from the gearbox input shaft 8 to the gearbox output shaft 20 may take place via the respective first or second planetary gear 10 or 12 and the countershaft 18. It may also take place directly via the first planetary gear 10, which has its first sunwheel 26 connected via the first mainshaft 34 to the gearbox output shaft 20 via a clutch mechanism 96. The clutch mechanism 96 comprises preferably a splined seventh shift sleeve 100, which is movable axially on the splined portions of the first mainshaft 34 and of the output shaft 20. Moving the seventh shift sleeve 100 to connect the splined portions with shift sleeve 100 it will lock the first mainshaft 34 to the output shaft 20, rendering both rotatable at the same speed. By disconnecting the fifth gearwheel 92 of the fifth gear pair 21 from the countershaft 18 it is possible for torque from the second planetary gear 12 to be transferred to the countershaft 18 and thence to the first mainshaft 34 connected to the first planetary gear 10 in order, via the clutch mechanism 96, to finally transfer torque to the gearbox output shaft 20.

During operation, the gearbox 2 may in certain situations operate in such a way that one of the sunwheels 26 and 32 is locked to the respective first or second planet wheel carrier 50 or 51 by the respective first or second clutch unit 56 or 58. The respective first or second mainshaft 34 or 36 will then rotate at the same speed as the gearbox input shaft 8, depending on which of the sunwheels 26 and 32 is locked to the respective planet wheel carrier. One or both of the electrical machines 14 and 16 may serve as a generator to supply electrical energy to the energy store 46. Alternatively, the respective electrical machine may provide a torque contribution to increase the torque on the output shaft 20. In certain operating situations, the electrical machines will provide each other with electrical energy independently of the energy store 46.

It is also possible for both of the electrical machines 14 and 16 to simultaneously generate current to the energy store 46. During engine braking, the driver releases the vehicle's accelerator pedal (not depicted). The gearbox output shaft 20 then drives one or both of the electrical machines while at the same time the combustion engine 4 and the electrical machines apply engine braking. The electrical machines here generate electrical energy, which goes into the vehicle's energy store 46. This operating state is called regenerative braking. To make more powerful braking action possible, the engine output shaft 97 may be locked and thereby be prevented from rotating, with the result that one or both of the electrical machines 14 and 16 will serve as brakes and generate electrical energy, which goes into the energy store 46. Locking of the engine output shaft 97 may also be effected when the vehicle is to be accelerated by one or both of the electrical machines 14, 16. If the torque of either or both of them exceeds that of the combustion engine, taking into account the gear ratio between them, the engine will not be able to withstand the large torque generated by the electrical machines 14, 16, so locking of the engine output shaft 97 becomes necessary. This locking will preferably be by a locking device 102 situated between the first planet wheel carrier 50 and the gear housing 42. Locking the first planet wheel carrier 50 and the gear housing 42 will also lock the engine output shaft 97, since the latter is connected to the first planet wheel carrier 50 via the gearbox input shaft 8. The locking device 102 preferably comprises a splined eighth shift sleeve 104, which can be moved axially on a splined portion of the first planet wheel carrier 50 and a splined portion of the gear housing 42. Moving the eighth shift sleeve 104 so that the splined portions connect via it will prevent rotation of the first planet wheel carrier 50 and hence of the engine output shaft 97.

The control unit 48 is connected to the electrical machines 14 and 16 and adapted to causing them in certain appropriate operating situations to use stored electrical energy for imparting driving force to the gearbox output shaft 20, and in other operating situations to use the kinetic energy of the gearbox output shaft 20 to gain and store electrical energy. The control unit therefore monitors the speed and/or torque of the engine output shaft 97 via sensors 98 associated with the electrical machines 14, 16, and the speed and/or torque of the gearbox output shaft 20, in order thereby to obtain information and cause the electrical machines 14, 16 to serve as electric motors or generators. The control unit 48 may be a computer with suitable software for this purpose. It will also control the flow of electrical energy between the energy store 46 and the respective stators 40 and 44 of the electrical machines 14, 16. In situations where the electrical machines serve as motors, stored electrical energy is supplied from the energy store 46 to the stators 40, 44. In situations where the electrical machines 14, 16 serve as generators, electrical energy is supplied from the stators 40, 44 to the energy store 46. As mentioned above, however, the electrical machines 14, 16 may in certain operating situations provide each other with electrical energy independently of the energy store 46.

The first and second clutch units 56 and 58, the first, second, third, fourth and fifth clutch elements 84, 86, 88, 90 and 93, the clutch mechanism 96 between the first mainshaft 34 and the output shaft 20, and the locking device 102 between the first planet wheel carrier 50 and the gear housing 42, are connected to the control unit 48 via their respective shift sleeves, which are preferably activated and deactivated by electrical signals from the control unit 48. The shift sleeves are preferably moved by undepicted power means, e.g. by hydraulic or pneumatic cylinders. It is also possible for them to be moved by electrically operated power means.

In the example depicted in FIG. 2, there are four pinions 62, 68, 74 and 80, four gearwheels 64, 70, 76 and 82 and two planetary gears 10 and 12 with associated electrical machines 14 and 16. It is possible, however, for the gearbox 2 to be provided with more or fewer pinions and gearwheels and with more planetary gears with associated electrical machines.

There follows a description of an upshift from a first to a seventh gear in a case where the gearbox 2 is situated in a vehicle 1 and the vehicle's propulsion is by the combustion engine 4.

The gearbox input shaft 8 is connected to the output shaft 97 of the vehicle's combustion engine 4. The gearbox output shaft 20 is connected to a driveshaft 99 of the vehicle 1. When the engine 4 is idling and the vehicle 1 is stationary, the input shaft 8 of the gearbox rotates while at the same time its output shaft 20 is motionless. The locking device 102 is deactivated, so the engine output shaft 97 can rotate freely. As the gearbox input shaft 8 is rotating, the first planet wheel carrier 50 will also rotate, causing the first set of planet wheels 52 to rotate. As the first planet wheel carrier 50 is connected to the second sunwheel 32, this second sunwheel 32 and hence also the second set of planet wheels 54 will also rotate. Not supplying current to the first and second electrical machines 14, 16 will cause the respective first and second ring gears 22 and 28 connected to their respective first and second rotors 24 and 30 to rotate freely, and no torque will be absorbed by the ring gears. The first and second clutch units 56 and 58 are disconnected and therefore not applied, which means that no torque will be transferred from the combustion engine 4 to the first planetary gear's sunwheel 26, nor to the second planetary gear's planet wheel carrier 51. The clutch mechanism 96 between the first mainshaft 34 and the output shaft 20 is disconnected, so these two shafts can rotate freely relative to one another. As the first planetary gear's sunwheel 26, the second planetary gear's planet wheel carrier 51 and gearbox output shaft 20 are at this stage motionless, the countershaft 18 will also be motionless. As a first step the fourth gearwheel 82 and the third gearwheel 76 are connected to the countershaft 18 by the respective fourth and third clutch elements 90 and 88. The first gearwheel 64 and the second gearwheel 70 are disconnected from the countershaft 18, allowing them to rotate freely relative to one another and to the countershaft 18. The fifth gearwheel 92 of the fifth gear pair 21 is locked to the countershaft 18 by the fifth clutch element 93.

For rotation of the gearbox output shaft 20 to commence with a view to propelling the vehicle, the fourth pinion 80 and the fourth gearwheel 82 on the countershaft 18 have to be caused to rotate, which is achieved by the second planet wheel carrier 51 being caused to rotate. When it does so, the second mainshaft 36 will also rotate, and hence too the fourth pinion 80 situated on it. The second planet wheel carrier 51 is caused to rotate by the second ring gear 28 being operated by the second electrical machine 16. Activating the second electrical machine 16 and running the combustion engine 4 at a suitable speed results in the vehicle 1 beginning to be moved by the second mainshaft 36 beginning to rotate. When the second planet wheel carrier 51 and the second sunwheel 32 reach the same speed, they are locked together by the second clutch unit 58. As mentioned above, the second clutch unit 58 is preferably so configured that the second sunwheel 32 and the second planet wheel carrier 51 engage mechanically with one another. Alternatively the second clutch unit 58 may be configured as a sliding brake or a disc clutch, which gently connects the second sunwheel 32 to the second planet wheel carrier 51. When they are so connected, the second planet wheel carrier 51 will rotate at the same speed as the engine output shaft 97. The torque generated by the combustion engine 4 will thus be transferred to the gearbox output shaft 20 via the fourth pinion 80, the fourth gearwheel 82 on the countershaft 18, the fifth gearwheel 92 on the countershaft 18 and the sixth gearwheel 94 on the gearbox output shaft 20. The vehicle 1 will therefore begin to move and run in a first gear.

The first, second, third and fourth gear pairs 60, 66, 72, 78 each have a ratio appropriate to the vehicle's desired operating characteristics. In the embodiment example in FIG. 2, the fourth pair 78 has a higher ratio than the first, second and third pairs 60, 66, 72, so it is connected when the lowest gear is engaged. Like the fourth pair, the second gear pair 66 transfers torque between the second mainshaft 36 and the countershaft 18 and might instead have a higher ratio than the other pairs 60, 72, 78, in which case it would therefore be connected when the lowest gear is engaged.

When the countershaft 18 is caused to rotate by the fourth gearwheel 82 situated on it, the third gearwheel 76 on the same shaft will also rotate. The countershaft 18 thus drives the third gearwheel 76, which itself drives the third pinion 74 on the first mainshaft 34. When the first mainshaft rotates, the first sunwheel 26 will also rotate and will therefore, depending on the speed of the engine output shaft 97 and hence the speed of the first planet wheel carrier 50, cause the first ring gear 22 and the first rotor 24 of the first electrical machine 14 to rotate. In this situation, it is possible to have the first electrical machine 14 serve as a generator to supply current to the energy store 46 and/or to the second electrical machine 16. Alternatively, the first electrical machine 14 may deliver a torque contribution by the control unit 48 causing it to impart propulsive torque.

To shift from a first gear to a second gear, the locking between the second sunwheel 32 and the second planet wheel carrier 51 has to be ended, which is achieved by the first and/or the second electrical machine 14, 16 being operated in such a way that torque balance occurs in the second planetary gear 12. This is followed by the second clutch unit 58 being caused to release the second sunwheel 32 and the second planet wheel carrier 51 from one another. The second gear is engaged by the control unit 48 operating the combustion engine 4 in such a way that a synchronous speed is reached between the first planet wheel carrier 50 and the first sunwheel 26, with a view to locking between them, which is effected by the first clutch unit 56 being operated in such a way that they become connected mechanically to one another. Alternatively, the first clutch unit 56 may be configured as a sliding brake or a disc clutch, which gently connects the first sunwheel 26 to the first planet wheel carrier 50. By synchronising the operation of the combustion engine and the respective first and second electrical machines 14 and 16 a smooth and break-free transition from a first gear to a second may be conducted.

The first mainshaft 34 will now be rotating, driven by the engine output shaft 97, and itself be driving the third pinion 74. The first planet wheel carrier 50 will thus be driving the third pinion 74 via the first sunwheel 26 and the first mainshaft 34. The third gearwheel 76, being in engagement with the third pinion 74 and firmly connected to the countershaft 18, will drive the countershaft 18, which itself drives the fifth gearwheel 92 situated on it. The fifth gearwheel drives the gearbox output shaft 20 via the sixth gearwheel 94 situated on the latter. The vehicle will now be running in a second gear.

When the countershaft 18 is caused to rotate by the third gearwheel 76, the fourth gearwheel 82 will also rotate. The countershaft 18 thus drives the fourth gearwheel 82 which itself drives the fourth pinion 80 on the second mainshaft 36. When the second mainshaft rotates, the second planet wheel carrier 51 will also rotate and will therefore, depending on the speed of the engine output shaft 97 and hence the speed of the first planet wheel carrier 50, cause the second ring gear 28 and the second rotor 30 of the second electrical machine 16 to rotate. In this situation, it is possible to have the second electrical machine serve as a generator to supply current to the energy store 46 and/or to the first electrical machine 14. The second electrical machine 16 may also deliver a torque contribution by the control unit 48 causing it to impart propulsive torque.

To shift from a second gear to a third gear, the fourth gearwheel 82 on the countershaft has to be disconnected from the countershaft 18 by the fourth clutch element 90 so that it can rotate freely relative to the countershaft 18. Thereafter, the countershaft 18 is connected to the second gearwheel 70 on it by the second clutch element 86. Connecting the countershaft 18 to the second gearwheel 70 on it is preferably effected by operating the second electrical machine 16 in such a way that a synchronous speed is reached between them. A synchronous speed may be established by measuring the speed of the second rotor 30 of the second electrical machine and the speed of the output shaft 20. The speed of the second mainshaft 36 and the speed of the countershaft 18 may therefore be determined by a given gear ratio relationships. The speeds of the respective shafts 18, 36 are controlled, and, when a synchronous speed is reached between the countershaft 18 and the second gearwheel 70, they are connected together by the second clutch element 86.

To effect the shift from a second gear to a third gear, the locking between the first sunwheel 26 and the first planet wheel carrier 50 has to be ended, which is achieved by the first and/or the second electrical machine 14, 16 being operated in such a way that torque balance occurs in the first planetary gear 10, followed by the first clutch unit 56 being caused to release the first sunwheel 26 and the first planet wheel carrier 50 from one another. Thereafter, the combustion engine 4 is operated in such a way that a synchronous speed is reached between the second sunwheel 32 and the second planet wheel carrier 51 so that the second clutch unit 58 can be engaged in order to connect the second sunwheel 32 to the second planet wheel carrier 51 by means of the shift sleeve 57. By synchronising the operation of the combustion engine 4 and the respective first and second electrical machines 14 and 16 a smooth and break-free transition from a second gear to a third may be conducted.

The third gearwheel 76 is released by the first electrical machine 14 being operated in such a way that a torque-free state occurs between the countershaft 18 and the third gearwheel 76, whereupon the third clutch element 88 is caused to release the third gearwheel 76 from the countershaft 48. This is followed by the first electrical machine 14 being operated in such a way that a synchronous speed is reached between the countershaft 18 and the first gearwheel 64 on it, whereupon the first gearwheel 64 is connected to the countershaft 18 by the first clutch element 84. A synchronous speed may be established by measuring the speed of the first rotor 24 of the first electrical machine 14 and the speed of the output shaft 20, followed by the speeds of the shafts 18, 34 being controlled in such a way that a synchronous speed is reached. The speeds of these shafts may therefore be determined by given gear ratio relationships.

The second mainshaft 36 will now be rotating at the same speed as the engine output shaft 97 and will itself be driving the second pinion 68. The second gearwheel 70, being in engagement with the second pinion 68 and firmly connected to the countershaft 18, will drive the countershaft 18, which itself drives the fifth gearwheel 92 situated on it. The fifth gearwheel drives the gearbox output shaft 20 via the sixth gearwheel 94 situated on the latter. The vehicle will now be running in a third gear.

When the countershaft 18 is caused to rotate by the second gearwheel 70 situated on it, the first gearwheel 64 on the same shaft will also rotate. The countershaft 18 thus drives the first gearwheel 64 which itself drives the first pinion 62 on the first mainshaft 34. When the first mainshaft 34 rotates, the first sunwheel 26 will also rotate and will therefore, depending on the speed of the engine output shaft 97 and hence the speed of the first planet wheel carrier 50, cause the first ring gear 22 and the first rotor 24 of the first electrical machine 14 to rotate. In this situation, it is possible to have the first electrical machine 14 serve as a generator to supply current to the energy store 46 and/or to the second electrical machine 16. Alternatively, the first electrical machine may deliver a torque contribution by the control unit 48 causing it to impart propulsive torque.

To shift from a third gear to a fourth gear, the locking between the second sunwheel 32 and the second planet wheel carrier 51 has to be ended, which is achieved by the first and/or the second electrical machine 14, 16 being operated in such a way that torque balance occurs in the second planetary gear 12, which is followed by the second clutch unit 58 being caused to release the second sunwheel 32 and the second planet wheel carrier 51 from one another. A fourth gear is thereafter engaged by the control unit 48 operating the combustion engine 4 in such a way that a synchronous speed is reached between the first planet wheel carrier 50 and the first sunwheel 26, with a view to locking between them, which is effected by the first clutch unit 56 being operated in such a way that they become connected mechanically to one another. By synchronising the operation of the combustion engine and the respective first and second electrical machines 14 and 16 a smooth and break-free transition from a third to a fourth gear may be conducted.

The first mainshaft 34 will now be rotating and being driven by the engine output shaft 97 and itself be driving the first pinion 62. The first planet wheel carrier 50 will thus be driving the first pinion via the first sunwheel 26 and the first mainshaft 34. The first gearwheel 64, being in engagement with the first pinion 62 and firmly connected to the countershaft 18, will drive the countershaft 18, which itself drives the fifth gearwheel 92 situated on it. The fifth gearwheel 92 drives the gearbox output shaft 20 via the sixth gearwheel 94 situated on the latter. The vehicle 1 will now be running in a fourth gear.

When the countershaft 18 is caused to rotate by the first gearwheel 64, the second gearwheel 70 will also rotate. The countershaft 18 thus drives the second gearwheel 70 which itself drives the second pinion 68 on the second mainshaft 36. When the second mainshaft 36 rotates, the second planet wheel carrier 51 will also rotate and will therefore, depending on the speed of the engine output shaft 97 and hence the speed of the first planet wheel carrier 50, cause the second ring gear 28 and the second rotor 30 of the second electrical machine 16 to rotate. In this situation it is possible to have the second electrical machine 16 serve as a generator to supply current to the energy store 46 and/or to the first electrical machine 14. The second electrical machine 16 may also deliver a torque contribution by the control unit 48 causing it to impart propulsive torque.

To shift from a fourth gear to a fifth gear the first gearwheel 64 has to be taken out of engagement with the countershaft 18 so that the fourth gear is disengaged. This is achieved by the combustion engine 4 and the first electrical machine 14 being operated in such a way that the first gearwheel 64 is put into a torque-free state relative to the countershaft 18, whereupon the first clutch element 84 is disengaged so that the first gearwheel 64 is disconnected from the countershaft 18.

Thereafter, the speed of the first mainshaft 34 is synchronised with that of the output shaft 20, followed by the clutch mechanism 96 being used to connect these two shafts together.

Thereafter, the combustion engine 4 and the first electrical machine 14 are operated in such a way that the propulsive torque passes via the first mainshaft 34 and through the clutch mechanism 96 and thence to the output shaft 20. By reducing the torque from the second electrical machine 16 it is possible for the fifth clutch element 93 to be put into a torque-free state relative to the countershaft 18, whereupon the fifth clutch element 93 is disengaged so that the fifth gearwheel 92 of the fifth gear pair 21 is disconnected from the countershaft 18.

Thereafter, the second electrical machine 16 is used to synchronise the speed of the countershaft 18 with that of the third gearwheel 76, followed by the third clutch element 88 being used to connect the third gearwheel to the countershaft 18. When this has taken place, the propulsive torque may be divided between the combustion engine, the first electrical machine 14 and the second electrical machine 16. Thereafter, torque balance is created in the first planetary gear 10, followed by the first clutch unit 56 disconnecting the first planet wheel carrier 50 and the first sunwheel 26 from one another. Finally, the speed of the second planet wheel carrier 51 is synchronised with that of the second sunwheel 32, followed by the second clutch unit 58 being used to connect them to one another.

The second mainshaft 36 will now be rotating at the same speed as the engine output shaft 97 and will itself be driving the second pinion 68. The second gearwheel 70, being in engagement with the second pinion 68 and firmly connected to the countershaft 18, will drive the countershaft 18, which itself drives the third gearwheel 76 situated on it. The third gearwheel 76 drives the first mainshaft 34 via the third pinion 74, and the gearbox output shaft 20 is thus driven via the clutch mechanism 96 which connects the first mainshaft 34 to the gearbox output shaft 20. The vehicle 1 will now be running in a fifth gear.

To shift from a fifth to a sixth gear, the locking between the second sunwheel 32 and the second planet wheel carrier 51 has to be ended, which is achieved by the first electrical machine 14 and the combustion engine 4 being operated in such a way that torque balance occurs in the second planetary gear 12, followed by the second clutch unit 58 being caused to release the second sunwheel 32 and the second planet wheel carrier 51 from one another. A sixth gear is thereafter engaged by the control unit 48 operating the combustion engine 4 in such a way that a synchronous speed is reached between the first planet wheel carrier 50 and the first sunwheel 26, with a view to locking between them, which is effected by the first clutch unit 56 being operated in such a way that they become connected mechanically to one another. By synchronising the operation of the combustion engine 4 and the respective first and second electrical machines 14 and 16 a smooth and break-free transition from a fifth to a sixth gear may be conducted.

The first mainshaft 34 will now be rotating and being driven by the combustion engine's output shaft 97 and will itself be driving the gearbox output shaft 20 via the clutch mechanism 96 which connects the first mainshaft 34 to the gearbox output shaft. The vehicle will now be running in a sixth gear.

To shift from a sixth to a seventh gear, the third gearwheel 76 on the countershaft has first to be disconnected from the countershaft 18 by the third clutch element 88 so that it can rotate freely relative to the countershaft 18. Thereafter the countershaft is connected to the first gearwheel 64 on it by the first clutch element 84. When the countershaft 18 and the first gearwheel 64 on it reach a synchronous speed, the first clutch element 84 is used to connect them together.

To effect the shift from a sixth gear to a seventh gear, the locking between the first sunwheel 26 and the first planet wheel carrier 50 has to be ended, which is achieved by the first and/or the second electrical machine 14, 16 being operated in such a way that torque balance occurs in the first planetary gear 10, followed by the first clutch unit 56 being caused to release the first sunwheel 26 and the first planet wheel carrier 50 from one another. Thereafter, the combustion engine 4 is operated in such a way that a synchronous speed is reached between the second sunwheel 32 and the second planet wheel carrier 51 so that the second clutch unit 58 can be engaged in order to connect the second sunwheel 32 to the second planet wheel carrier 51. By synchronising the operation of the combustion engine 4 and the respective first and second electrical machines 14 and 16 a smooth and break-free transition from a sixth gear to a seventh may be conducted.

The second mainshaft 36 will now be rotating at the same speed as the engine output shaft 97 and will itself be driving the second pinion 68. The second gearwheel 70, being in engagement with the second pinion 68 and firmly connected to the countershaft 18, will drive the countershaft 18, which itself drives the first gearwheel 64 situated on it. The first gearwheel 64 drives the first mainshaft 34 via the first pinion 62, and the gearbox output shaft 20 is thus driven via the clutch mechanism 96 which connects the first mainshaft 34 to the gearbox output shaft 20. The vehicle 1 will now be running in a seventh gear.

According to the above method, in order to transfer rotation speed and torque, the gearbox 2 is provided with pinions 62, 68, 74, 80 on mainshafts 34, 36 and with gearwheels 64, 70, 76, 82 on the countershaft 18, but it is possible to use some other type of transmission, e.g. chain and belt transmissions, to transfer rotation speed and torque in the gearbox.

The transmission device 19 has in the above embodiment example four gear pairs 60, 66, 72, 78, but might have any desired number of gear pairs.

As described above, torque from the gearbox 2 is extracted via the output shaft 20. It is also possible to extract torque directly from the first or the second mainshaft 34, 36 or directly from the countershaft 18. It may also be extracted in parallel from two or all three of the shafts 18, 34, 36 at the same time.

Figure 3:
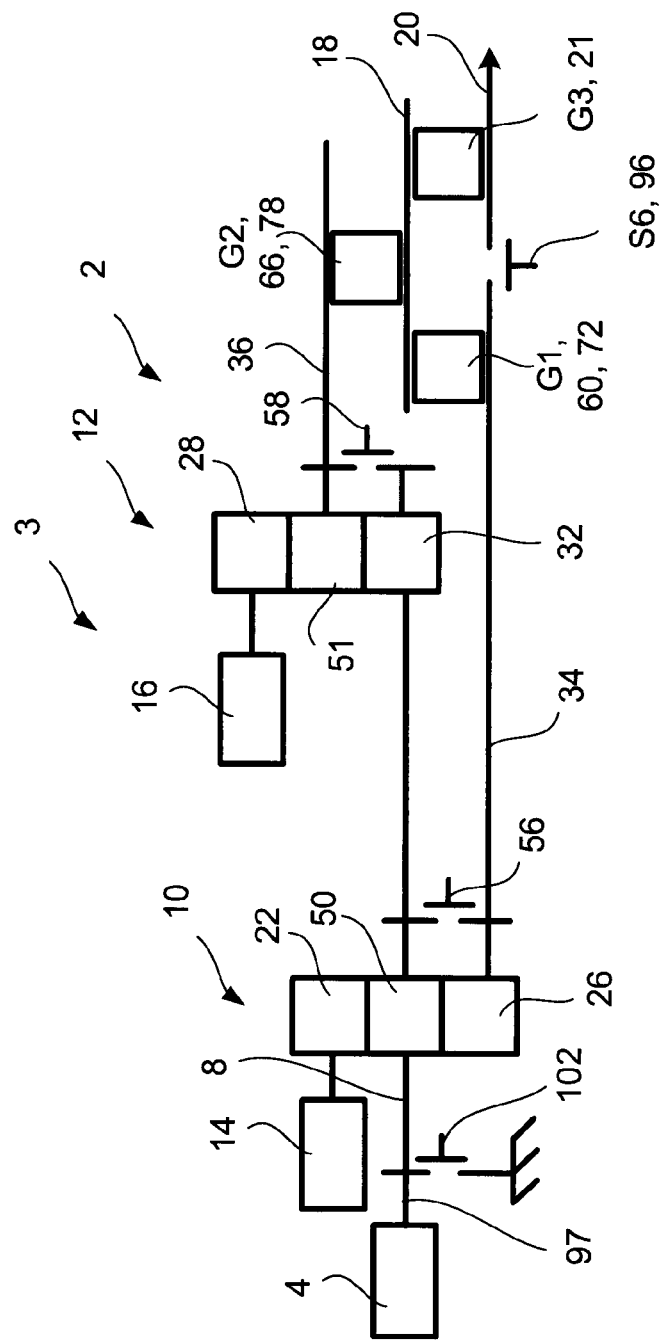
FIG. 3 is a simplified schematic view of the hybrid powertrain in FIG. 2.

FIG. 3 illustrates the hybrid powertrain 3 of FIG. 2 in a simplified view in which certain components have been omitted for the sake of clarity. G1 in FIG. 3 takes the form of at least one gear pair connected to the first mainshaft 34 and thereby to the first planetary gear 10, and G2 takes the form of at least one gear pair connected to the second mainshaft 36 and thereby to the second planetary gear 12. These gear pairs G1, G2 are also connected to the output shaft 20 via the countershaft 18. G1 and G2 may each comprise one or more gear pairs. The gear pair G1 connected to the first planetary gear 10 may for example comprise the first gear pair 60 and/or the third gear pair 72, as described with reference to FIG. 2. The gear pair G2 connected to the second planetary gear 12 may for example comprise the second gear pair 66 and/or the fourth gear pair 78, as described with reference to FIG. 2. Also depicted is at least one gear pair G3 which is connected to the output shaft 20 and the countershaft 18 and may take the form of the fifth gear pair 21 described with reference to FIG. 2. G3 may comprise one or more gear pairs.

Figure 4A:
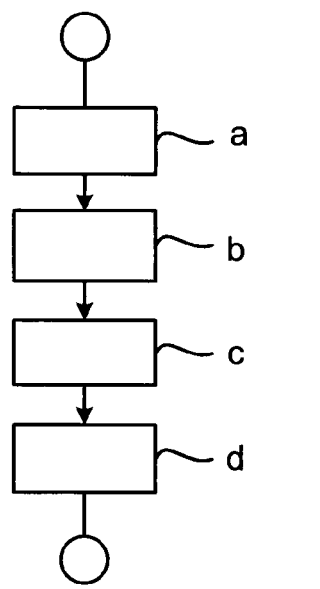
FIG. 4 is a flowchart of the method for controlling a hybrid powertrain according to the present invention.
Figure 4B:
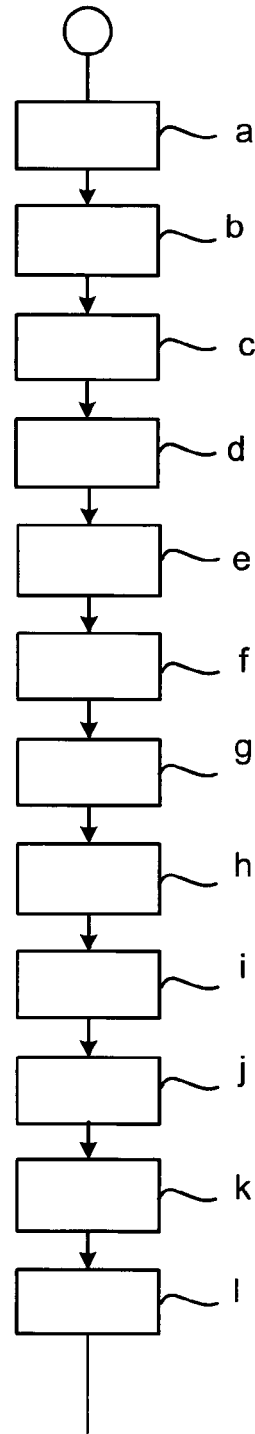
Figure 4B:
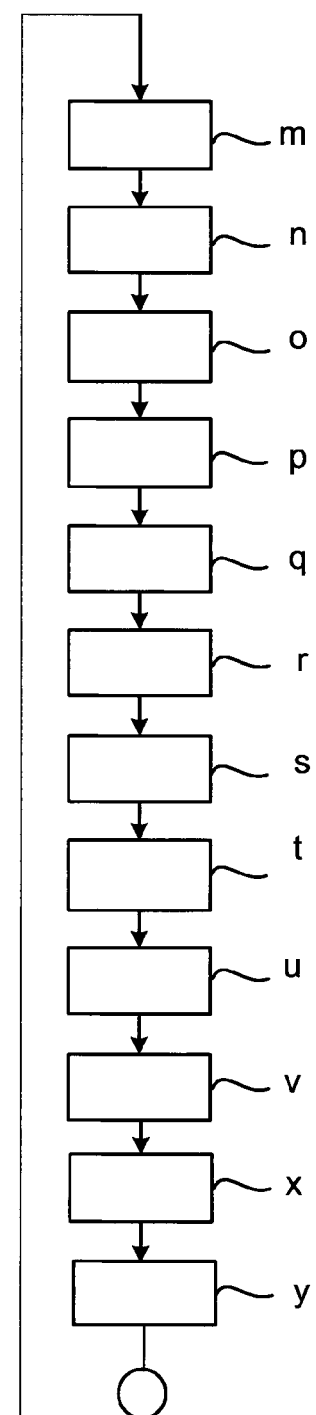

FIGS. 4a and 4b are flowcharts of the method for controlling a hybrid powertrain 3 comprising a combustion engine 4; a gearbox 2 provided with an input shaft 8 and an output shaft 20; a first planetary gear 10 connected to the input shaft 8; a second planetary gear 12 connected to the first planetary gear 10; a first electrical machine 14 connected to the first planetary gear 10; a second electrical machine 16 connected to the second planetary gear 12; a first gear pair 60 and a third gear pair 72 which are situated between the first planetary gear 10 and the output shaft 20; and a second gear pair 66 and a fourth gear pair 78, which are situated between the second planetary gear 12 and the output shaft 20.

FIG. 4a illustrates a method comprising the steps of
a) connecting the first or the third gear pair 60, 72,
b) connecting the second or the fourth gear pair 66, 78,
c) connecting a fifth gear pair 21 to a countershaft 18 so that the countershaft 18 is connected to the output shaft 20, and
d) engaging a gear by connecting two rotatable components 28, 32, 51 of the second planetary gear 12 to one another.

Advantageously, steps a), b) and with c) are conducted in parallel. Alternatively, they may be conducted in any desired sequence.

The two rotatable components 28, 32, 51 preferably comprise a second sunwheel 32 and a second planet wheel carrier 51, in which case the combustion engine 4 will at step d) be operated in such a way that a synchronous speed is reached between the second sunwheel 32 and the second planet wheel carrier 51, followed by a second clutch unit 58 being moved to lock them to one another.

Advantageously, the first gear pair 60 comprises a first pinion 62 attached firmly to the first planetary gear 10 and in mutual engagement with a first gearwheel 64, which is arranged to be connectable to and disconnectable from the countershaft 18.

Also advantageously, the third gear pair 72 comprises a third pinion 74 attached firmly to the first planetary gear 10 and in mutual engagement with a third gearwheel 76, which is arranged to be connectable to and disconnectable from the countershaft 18. Step a) preferably comprises the first or the third gearwheel 64, 76 being connected to the countershaft 18.

Advantageously, the second gear pair 66 comprises a second pinion 68 attached firmly to the first planetary gear 12 and in mutual engagement with a second gearwheel 70 which is arranged to be connectable to and disconnectable from the countershaft 18. The fourth gear pair 78 comprises with advantage a fourth pinion 80 attached firmly to the first planetary gear 12 and in mutual engagement with a fourth gearwheel 82 which is arranged to be connectable to and disconnectable from the countershaft 18. Step b) preferably comprises the second or the fourth gearwheel 70, 82 being connected to the countershaft 18.

Connecting the first or the third gear pair 60, 72 at step a) is preferably effected by the first electrical machine 14 being operated in such a way that a synchronous speed is reached between the countershaft 18 and the gearwheel 64, 76, which forms part of the gear pair 60, 72. When a synchronous speed is reached, the gearwheel 64, 76 is connected to the countershaft 18 by a respective first or third clutch element 84, 88.

Connecting the second or the fourth gear pair 66, 78 at step b) is preferably effected by the second electrical machine 16 being operated in such a way that a synchronous speed is reached between the countershaft 18 and the gearwheel 70, 82, which forms part of the gear pair 66, 78. When a synchronous speed is reached, the gearwheel 70, 82 is connected to the countershaft 18 by a respective second or fourth clutch element 86, 90.

Disconnecting the first or the third gear pair 60, 72 is preferably effected by the first electrical machine 14 being operated in such a way that a torque-free state occurs between the countershaft 18 and the gearwheel 64, 76 which forms part of the gear pair 60, 72. When a torque-free state is reached, the respective first or third clutch element 84, 88 is used to disconnect the gearwheel 64, 76 from the countershaft 18.

Disconnecting the second or the fourth gear pair 66, 78 is preferably effected by the second electrical machine 16 being operated in such a way that a torque-free state occurs between the countershaft 18 and the gearwheel 70, 82, which forms part of the gear pair 66, 78. When a torque-free state is reached, the respective second or fourth clutch element 86, 90 is used to disconnect the gearwheel 70, 82 from the countershaft 18.

Advantageously, the fifth gear pair 21 comprises fifth and sixth gearwheels 92, 94, which are in mutual engagement, the fifth gearwheel 92 being arranged to be connectable to and disconnectable from the countershaft 18 by a fifth clutch element 93, and being connected to it at step c).

FIG. 4b is a flowchart for a method comprising the steps a-d described with reference to FIG. 4a and the further steps of
e) disconnecting the rotatable components 28, 32, 51 of the second planetary gear 12 from one another, and f) engaging a subsequent gear by using a first clutch unit 56 to connect two rotatable components 22, 26, 50 of the first planetary gear 10.

Advantageously, step e) comprises operating the first and/or the second electrical machine 14, 16 in such a way that torque balance occurs in the second planetary gear 12, followed by the second clutch unit 58 being moved to disconnect the second sunwheel 32 and the second planet wheel carrier 51 from one another.

Advantageously, the two rotatable components 22, 26, 50 of the first planetary gear 10 comprise a first sunwheel 26 and a first planet wheel carrier 50, in which case the combustion engine 4 is operated at step f) in such a way that a synchronous speed is reached between the first sunwheel 26 and the first planet wheel carrier 50, followed by a first clutch unit 56 being moved to lock them to one another.

The method preferably further comprises the steps of
g) disconnecting whichever of the second and fourth gear pairs 66, 78 was connected at step b),
h) connecting whichever of the second and fourth gear pairs 66, 78 was not connected at step b),
i) disconnecting the rotatable components 22, 26, 50 of the first planetary gear 10 from one another,
j) engaging a subsequent gear by connecting two rotatable components 28, 32, 51 of the second planetary gear 12,
k) disconnecting whichever of the first and third gear pairs 60, 72 was connected at step a), and
l) connecting whichever of the first and third gear pairs 60, 72 was not connected at step a).

Advantageously, step i) comprises operating the first and/or the second electrical machine 14, 16 in such a way that torque balance occurs in the first planetary gear 10, followed by the first clutch unit 56 being moved to disconnect the first sunwheel 26 and the first planet wheel carrier 50 from one another.

Advantageously, step j) comprises the combustion engine being operated in such a way that a synchronous speed is reached between the second sunwheel 32 and the second planet wheel carrier 51, followed by the second clutch unit 58 being moved to lock them to one another.

The method further comprises the step of
m) repeating step e) of disconnecting the rotatable components 28, 32, 51 of the second planetary gear 12 from one another and step f) of engaging a subsequent gear by using a first clutch unit 56 to connect two rotatable components 22, 26, 50 of the first planetary gear 10 to one another.

The method preferably further comprises the steps of
n) disconnecting whichever of the first and third gear pairs 60, 72 was connected at step 1),
o) locking a clutch mechanism 96 situated between the first planetary gear 10 and the output shaft 20 so that the first planetary gear is connected to the output shaft,
p) disconnecting the fifth gear pair G3, 21,
q) connecting whichever of the first and third gear pairs 60, 72 was not disconnected at step n),
r) disconnecting the rotatable components 22, 26, 50 of the first planetary gear 10 from one another, and
s) engaging a subsequent gear by connecting two rotatable components 28, 32, 51 of the second planetary gear 12 to one another.

Advantageously, step r) comprises operating the first and/or the second electrical machine 14, 16 so that torque balance occurs in the first planetary gear 10, followed by the first clutch unit 56 being moved to disconnect the first sunwheel 26 and the first planet wheel carrier 50 from one another.

Advantageously, step s) comprises the combustion engine being operated in such a way that a synchronous speed is reached between the second sunwheel 32 and the second planet wheel carrier 51, followed by the second clutch unit 58 being moved to lock them to one another.

Advantageously, the method comprises the further step of
t) repeating step e) of disconnecting the rotatable components 28, 32, 51 of the second planetary gear 12 from one another and step f) of engaging a subsequent gear by using a first clutch unit 56 to connect two rotatable components 22, 26, 50 of the first planetary gear 10 to one another.

The method preferably comprises the further steps of
u) disconnecting whichever of the first and third gear pairs 60, 72 was connected at step q),
v) connecting whichever of the first and third gear pairs 60, 72 was not disconnected at step u),
x) disconnecting the rotatable components 22, 26, 50 of the first planetary gear 10 from one another, and
y) engaging a subsequent gear by connecting two rotatable components 28, 32, 51 of the second planetary gear 12 to one another.

Advantageously, step x) comprises operating the first and/or the second electrical machine 14, 16 so that torque balance occurs in the first planetary gear 10, followed by the first clutch unit 56 being moved to disconnect the first sunwheel 26 and the first planet wheel carrier 50 from one another.

Advantageously, step y) comprises the combustion engine 4 being operated in such a way that a synchronous speed is reached between the second sunwheel 32 and the second planet wheel carrier 51, followed by the second clutch unit 58 being moved to lock them to one another.

Connecting the first or the third gear pair 60, 72 is preferably effected by the first electrical machine 14 being operated in such a way that a synchronous speed is reached between the countershaft 18 and the gearwheel 64, 76 which forms part of the gear pair 60, 72. When a synchronous speed is reached, the gearwheel 64, 76 is connected to the countershaft 18 by a respective first or third clutch element 84, 88.

Connecting the second or the fourth gear pair 66, 78 is preferably effected by the second electrical machine 16 being operated in such a way that a synchronous speed is reached between the countershaft 18 and the gearwheel 70, 82 which forms part of the gear pair 66, 78. When a synchronous speed is reached, the gearwheel 70, 82 is connected to the countershaft 18 by a respective second or fourth clutch element 86, 90.

Disconnecting the first or the third gear pair 60, 72 is preferably effected by the first electrical machine 14 being operated in such a way that a torque-free state occurs between the countershaft 18 and the gearwheel 64, 76 which forms part of the gear pair 60, 72. When a torque-free state is reached, the respective first or third clutch element 84, 88 is used to disconnect the gearwheel 64, 76 from the countershaft 18.

Disconnecting the second or the fourth gear pair 66, 78 is preferably effected by the second electrical machine 16 being operated in such a way that a torque-free state occurs between the countershaft 18 and the gearwheel 70, 82, which forms part of the gear pair 66, 78. When a torque-free state is reached, the respective second or fourth clutch element 86, 90 is used to disconnect the gearwheel 70, 82 from the countershaft 18.

The hybrid powertrain 3 is thus controlled in such a way that shifts between different gears take place without torque breaks.

According to the present inventior, a computer program P is stored in the control unit 48 and/or the computer 53 and which may comprise routines for controlling the hybrid powertrain 3 according to the present invention.

The program P may be stored in an executable form or in compressed form in a memory M and/or in a read/write memory.

The invention relates also to a computer program product comprising a program code stored on a computer-readable medium for conducting the above method steps when said program code is run on the control unit 48 or another computer 53 connected to the control unit 48. The program code may be stored in a non-volatile way on the medium which can be read by a computer 53.

Cited components and features cited above may within the scope of the invention be combined between different versions cited.

The invention claimed is:

1. A hybrid powertrain comprising:
   a combustion engine;
   a gearbox with an input shaft and an output shaft;
   a first planetary gear connected to the input shaft and a first mainshaft;
   a second planetary gear connected to the first planetary gear and a second mainshaft;
   a first electrical machine connected to the first planetary gear;
   a second electrical machine connected to the second planetary gear;
   a first gear pair and a third gear pair, which are situated between the first planetary gear and the output shaft;
   a second gear pair and a fourth gear pair, which are situated between the second planetary gear and the output shaft;
   a countershaft provided between the respective first and second planetary gears and the output shaft,
   wherein a second planet wheel carrier of the second planetary gear is connected to the second mainshaft,
   wherein the input shaft is directly connected to a first planet wheel carrier of the first planetary gear, and rotates the first planet wheel carrier; and
   the countershaft is connected to the output shaft via a fifth gear pair.

2. A hybrid powertrain according to claim 1, wherein the first and third gear pairs are situated on the first mainshaft and the countershaft, and the second and fourth gear pairs are situated on the second mainshaft and the countershaft.

3. A hybrid powertrain according to claim 2, wherein the first planet wheel carrier of the first planetary gear is connected to a second sunwheel of the second planetary gear, and a first sunwheel of the first planetary gear is connected to the second mainshaft.

4. A hybrid powertrain according to claim 2, wherein a clutch mechanism is provided between the first mainshaft and the output shaft.

5. A hybrid powertrain according to claim 2, wherein the first gear pair comprises a first pinion attached firmly to the first mainshaft and in mutual engagement with a first gearwheel which is arranged to be connectable to and disconnectable from the countershaft, and wherein the third gear pair comprises a third pinion attached firmly to the first mainshaft and in mutual engagement with a third gearwheel which is arranged to be connectable to and disconnectable from the countershaft.

6. A hybrid powertrain according to claim 5, wherein the second gear pair comprises a second pinion attached firmly to the second mainshaft and in mutual engagement with a second gearwheel which is arranged to be connectable to and disconnectable from the countershaft, and wherein the fourth gear pair comprises a fourth pinion attached firmly to the second mainshaft and in mutual engagement with a fourth gearwheel which is arranged to be connectable to and disconnectable from the countershaft.

7. A hybrid powertrain according to claim 1, wherein the fifth gear pair comprises a gearshift element arranged to be disconnectable from the countershaft by a fifth clutch element.

8. A hybrid powertrain according to claim 7, wherein the gearshift element of the fifth gear pair is a fifth gearwheel in engagement with a sixth gearwheel which is attached firmly to the output shaft.

9. A hybrid powertrain according to claim 6, wherein the first, second, third and fourth gearwheels are arranged to be connectable to and disconnectable from the countershaft by respective first, second, third and fourth clutch elements.

10. A hybrid powertrain according to claim 1, wherein a first rotor of the first electrical machine is connected to a first ring gear of the first planetary gear, and a second rotor of the second electrical machine is connected to a second ring gear of the second planetary gear.

11. A hybrid powertrain according to claim 3, wherein a first clutch unit is arranged to connect the first sunwheel releasably to the first planet wheel carrier, and a second clutch unit is arranged to connect the second sunwheel releasably to the second planet wheel carrier.

12. A vehicle comprising an engine and a hybrid powertrain according to claim 1.

13. A method for controlling a hybrid powertrain in order to effect gear changes without torque breaks, wherein the hybrid powertrain comprises a combustion engine;
   a gearbox with an input shaft and an output shaft;
   a first planetary gear connected to the input shaft and a first mainshaft;
   a second planetary gear connected to the first planetary gear and a second mainshaft;
   a first electrical machine connected to the first planetary gear;
   a second electrical machine connected to the second planetary gear;
   a first gear pair and a third gear pair which are situated between the first planetary gear and the output shaft; and
   a second gear pair and a fourth gear pair which are situated between the second planetary gear and the output shaft,
   wherein a second planet wheel carrier of the second planetary gear is connected to the second mainshaft, and
   wherein the input shaft is connected to a first planet wheel carrier of the first planetary gear, the method comprising:
   a) connecting the first or the third gear pair,
   b) connecting the second or the fourth gear pair,
   c) connecting a fifth gear pair to a countershaft so that the countershaft is connected to the output shaft, and
   d) engaging a gear by connecting together two rotatable components of the second planetary gear.

14. A method according to claim 13, wherein steps a), b) and c) are conducted in parallel.

15. A method according to claim 13, wherein the first gear pair comprises a first pinion attached firmly to the first planetary gear and in mutual engagement with a first gearwheel which is arranged to be connectable to and disconnectable from the countershaft, and wherein the third gear pair comprises a third pinion attached firmly to the first planetary gear and in mutual engagement with a third gearwheel which is arranged to be connectable to and disconnectable from the countershaft, such that at step a) the first or the third gearwheel is connected to the countershaft.

16. A method according to claim 13, wherein the second gear pair comprises a second pinion attached firmly to the second planetary gear and in mutual engagement with a second gearwheel which is arranged to be connectable to and disconnectable from the countershaft, and wherein the fourth gear pair comprises a fourth pinion attached firmly to the second planetary gear and in mutual engagement with a fourth gearwheel which is arranged to be connectable to and disconnectable from the countershaft, such that at step b) the second or the fourth gearwheel is connected to the countershaft.

17. A method according to claim 13, wherein the fifth gear pair comprises a fifth gearwheel which is arranged to be connectable to and disconnectable from the countershaft by a fifth clutch element and is in mutual engagement with a sixth gearwheel which is attached firmly to the output shaft, such that at step c) the fifth gearwheel is connected to the countershaft.

18. A method according to claim 13, wherein, at step d), the two rotatable components comprise a second sunwheel and a second planet wheel carrier, and further comprising operating the combustion engine to reach a synchronized speed between the second sunwheel and the second planet wheel carrier, and then moving a second clutch unit to lock the second sunwheel and the second planet wheel carrier to one another.

19. A method according to claim 13, further comprising,
e) disconnecting the rotatable components of the second planetary gear from one another, and
f) engaging a subsequent gear by using a first clutch unit to connect two rotatable components of the first planetary gear.

20. A method according to claim 19, wherein step e) comprises the first and/or the second electrical machine to cause a torque balance in the second planetary gear, wherein, at step f), the two rotatable components comprise a first sunwheel and a first planet wheel carrier, and further comprising operating the combustion engine to reach a synchronised speed between the first sunwheel and the first planet wheel carrier, and then moving the first clutch unit to lock the first sunwheel and the first planet wheel carrier to one another.

21. A method according to claim 19, further comprising,
g) disconnecting whichever of the second and fourth gear pairs was connected at step b),
h) connecting whichever of the second and the fourth gear pairs was not connected at step b),
i) disconnecting the rotatable components of the first planetary gear from one another,
j) engaging a subsequent gear by connecting two rotatable components of the second planetary gear,
k) disconnecting whichever of the first and third gear pairs was connected at step a), and
l) connecting whichever of the first and third gear pairs was not connected at step a).

22. A method according to claim 21, further comprising,
m) repeating steps e) and f).

23. A method according to claim 22, further comprising,
n) disconnecting whichever of the first and third gear pairs was connected at step 1),
o) locking a clutch mechanism situated between the first planetary gear and the output shaft so that the first planetary gear becomes connected to the output shaft+,
p) disconnecting the fifth gear pair,
q) connecting whichever of the first and third gear pairs was not disconnected at step n),
r) disconnecting the rotatable components of the first planetary gear from one another, and
s) engaging a subsequent gear by connecting two rotatable components of the second planetary gear to one another.

24. A method according to claim 23, further comprising,
t) repeating steps e) and f).

25. A method according to claim 24, further comprising,
u) disconnecting whichever of the first and third gear pairs was connected at step q),
v) connecting whichever of the first and third gear pairs was not disconnected at step u),
x) disconnecting the rotatable components of the first planetary gear from one another, and
y) engaging a subsequent gear by connecting two rotatable components of the second planetary gear to one another.

26. A computer program product comprising: a non-transitory computer readable medium and program code stored on the computer-readable medium for conducting method steps according to claim 13 when said program code is run on an electronic control unit or another computer connected to the electronic control unit.

* * * * *